Dec. 29, 1953

W. SARVIE

ACTUATING AND LOCKING MEANS FOR THE HANDLES OF PLIER TYPE TOOLS

Original Filed Aug. 24, 1949

Re. 23,761

Walter Sarvie

INVENTOR.

BY Thomas A. O'Brien and Harvey B. Jacobson

Attorneys

Reissued Dec. 29, 1953 Re. 23,761

UNITED STATES PATENT OFFICE 23,761

ACTUATING AND LOCKING MEANS FOR THE HANDLES OF PLIER TYPE TOOLS

Walter Sarvie, Alexandria, Minn.

Original No. 2,539,865, dated January 30, 1951, Serial No. 112,080, August 24, 1949. Application for reissue January 23, 1953, Serial No. 333,023

7 Claims. (Cl. 81—49)

Matter enclosed in heavy brackets [ ] appears in the original patent but forms no part of this reissue specification; matter printed in italics indicates the additions made by reissue.

This invention relates generally to tools and more particularly to an actuating and locking mechanism for a pliers type tool, the mechanism being operatively mounted upon the ends of the handles remote from the jaws of the tool.

A primary object of this invention is to provide means for increasing the gripping power of a pliers type tool beyond the power exerted by merely grasping the handles of the tool, the instant invention having means associated with the outer ends of the handles including a lever and a latch bar which cooperate to allow the tightening of the grip of the tool by actuation of the lever after the tool has been initially tightened as much as possible by hand-grip pressure applied directly to the handles.

Another very important object of this invention is to provide means for locking a pliers type tool so as to maintain a vise-like grip upon work compressed between the jaws of the tool.

Another object, closely allied to the immediately preceding object, is to provide a locking means such as that already mentioned and wherein the actual locking is accomplished simply by shifting of a lever transversely of the tool after the lever has been pivoted upon a latch plate.

Still another object of this invention is to provide an improved latch plate, wherein the edges designed to grip a shank portion of a handle of the tool are generated by boring the latch plate at a small angle whereby a larger diameter bore may be used to provide more nearly friction free movement of the shank portion in unlocked position and greater gripping action of the latch plate on the shank portion when the latch plate is in locked position.

Another specific object is to provide simple means for maintaining a latch plate and actuating lever in proper alignment with each other and with a shank on one of the handles.

Yet another object is to provide simple means for unlocking a tool of this character from a tightly locked position on a piece of work.

And the last object to be mentioned specifically is to provide a tool which is inexpensive and practicable to manufacture, safe and simple to use, and which will give generally efficient and durable service.

Figure 1:
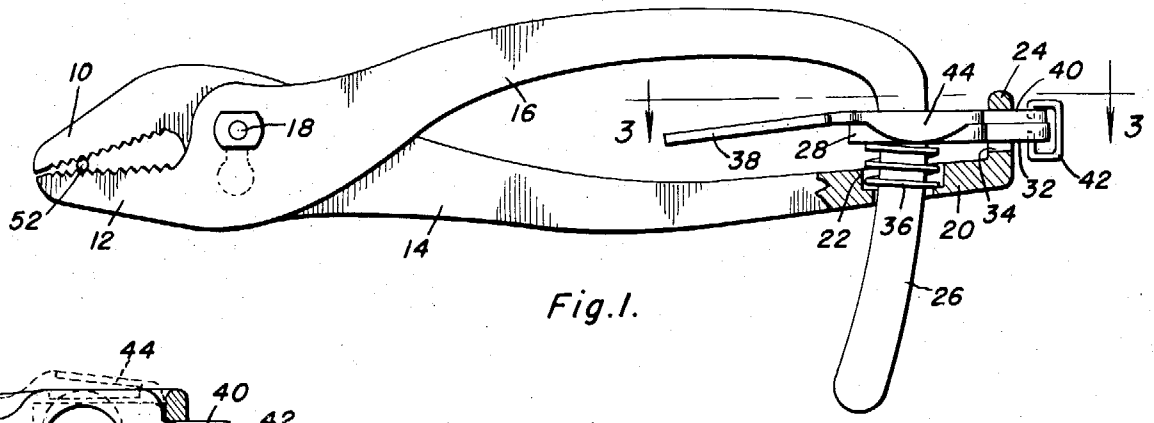
Figure 4:
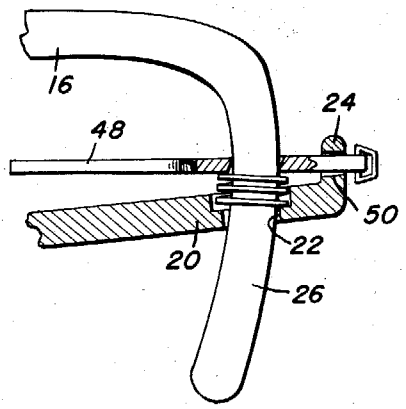
Figure 2:
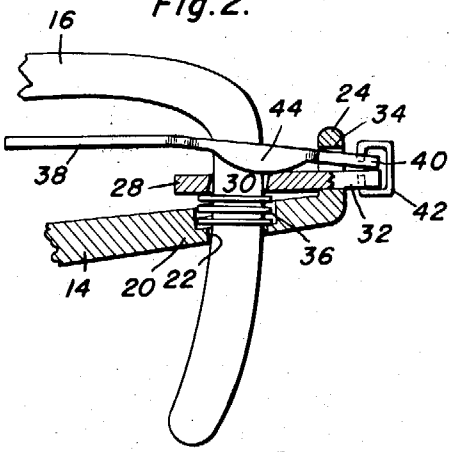
Figure 3:
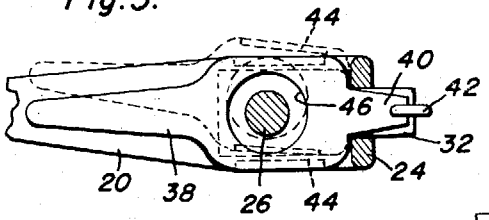

With these objects definitely in view, this invention resides in certain novel features of construction, combination and arrangement of elements and portions as will be hereinafter described in detail in the specification, particularly pointed out in the appended claims and illustrated in the accompanying drawings which form a material part of this application, and in which:

Figure 1 is a side elevational view of a pair of pliers, a portion of one handle being broken away in order to show the underlying parts more clearly, the figure including representation of a piece of work being gripped by the pliers and the handles and the actuating and locking means being depicted in positions assumed at the time when the handles have been compressed by hand but before the lever has been actuated to further increase the gripping action;

Figure 2 is an enlarged fragmentary view, representing the handle actuating and locking means depicted in Figure 1 but showing the lever in a second position, as at the time when this lever has been shifted manually to further tighten the pliers' grip, the latch plate in this figure being partially broken away and the underlying parts shown in vertical section in order that the inclined bore therein with the shank gripping edges might be fully illustrated;

Figure 3 is a horizontal sectional view, taken substantially upon the line 3—3 in Figure 1, and showing the lever in dash lines in a position in which one of the flanges on said lever is contacting a surface of the latch plate, that is, the lever has been shifted transversely to lock the handles in fully tightened position; and Figure 4 is a view, partly in elevation and partly in vertical section, designed to show a simplified modified form of this invention wherein the above-mentioned lever is deleted.

Similar characters of reference designate similar or identical elements and portions throughout the specification and through the different views in the drawings.

Referring now to the drawings in detail, this invention includes a pliers type tool represented as having a pair of opposing jaws 10 and 12 integral with handles 14 and 16, respectively, and pivoted together by a pivot pin 18, according to conventional practice.

The handle 14 has an end portion 20 which may be broadened as best illustrated in Figure 3 and which is provided with a stepped aperture 22. The end portion 20 has what may be termed a terminal 24 extending substantially right angularly with the handle 14, while the handle 16 is provided with a shank 26, preferably circular in cross-section and curved slightly, with the center of curvature approximately coinciding with the pivot pin 18, and it will be noted that the shank 26 extends toward and beyond the handle 14 and passes through the stepped aperture 22.

A latch plate 28 is provided with a bore 30 which is inclined to a line perpendicular to the latch plate 28 so that sharp gripping edges are provided to engage the shank 26. The hardness of the shank and the gripping edges must be such that the gripping edges will not deform the shank to an extent causing interference with the free action of the shank in the bore 30. It will be understood that this latch plate extends in the same general direction as the end portion 20 of said one handle, and that the shank 26 passes through the bore 30. The latch plate has an extension 32 passing through and beyond a slot 34 in the terminal 24. The latch plate 28 is biased in one direction by a spring 36 arranged coaxially of the adjacent portion of the shank 26 and seated with one end within the stepped aperture 22 and the other end in frictional contact with the adjacent surface of the latch plate 28.

An actuating lever 38 also has an extending portion 40 reaching through the slot 34 and engaging the extension 32 of the latch plate. Any simple means such as the C-shaped clip 42 will be used to retain the extension 32 in connection with the extending portion 40, the C-shaped clip 42 allowing limited but sufficient pivotal movement of the lever in one direction relative to the latch plate 28 and also allowing shifting of the lever 38 in a transverse direction. This shifting of the lever in a transverse direction is used in locking the lever in position after the tightening process has been completed, and a pair of flanges 44, integral with the lever 38, are provided to enable the operator to lock the lever 38 by pivotally shifting the lever transversely into the position indicated in dash line in Figure 3, with one of the flanges 44 engaging the adjacent surface of the latch plate 28. In order to allow this transverse movement of the lever 38, the bore 46 in the lever is of a larger diameter than the diameter of the shank 26.

In Figure 4, a modified and simplified embodiment of this invention, or possibly better considered a portion of this invention, is illustrated. In this embodiment, the lever 38 is entirely deleted and the latch plate 48 is elongated to facilitate the manual operation thereof, as in the unlocking of the latch plate to release the handle. It will also be noted that the slot 50 is reduced since there is no need to accommodate the lever 38. The device illustrated in Figure 4 is essentially a part of the device illustrated in the other figures, the locking action being accomplished by the apparatus illustrated in Figure 4 but the actuating of the handles being accomplished by hand-grip pressure on the handles directly.

The operation of this invention will be clearly understood from a consideration of the foregoing description of the mechanical details thereof, taken in connection with the drawings and with the above recited objects. In recapitulation, it may be noted that work represented at 52 in Figure 1 will be reasonably tightly gripper between the jaws 10 and 12 when the handles 14 and 16 are pressed together by hand. Further tightening upon the work 52 is accomplished by shifting the lever 38 as upwardly about its pivotal connection with the extension 32 of the latch plate, into the position indicated in Figure 2 and finally into the position indicated in dash line in Figure 3 to lock the pliers in completely tightened position. The advantages of the inclined bore 30 will now be obvious. In releasing the pliers, the lever 38 is used to move the latch plate against the action of the spring 36 and is normally limited in such movement by the handle 14 which serves as a stop so that the shank 26 is free to slide through the bore 30.

The inclined bore 30 retains the advantages of a small transverse bore in that the spacing of the gripping edges transversely of the shank is actually decreased, when the latch plate is in shank gripping position, while the advantage of a larger transverse bore is retained because a wide clearance between these edges and the shank is provided when the *latch* plate is in released position. *The diameter of the annular bores of the latch plates 28 and 48, as shown in Figures 1, 2 and 4, are such as to provide substantial clearance about the rounded, curved shank 26 when the latch plate is swingably released.*

*It will be noted that the general plane of the latch plate when the shank is gripped, is positioned almost radially of the pivot pin 18 of the pliers, the gripping edges of the inclined annular bore then uniformly and sharply gripping the round, curved shank at opposite sides thereof. In this connection, the fulcruming of the reduced outer end of the latch plate in the oblong shaped slot 34 of the handle extension, permits slight longitudinal shifting of the latch plate which is particularly essential when the pliers are adjusted for gripping larger objects by means of the pivotal shift joint illustrated in dotted lines in Figure 1. Thus, the latch plate can never bind when, by finger action, it is depressed and released from the gripping positions shown in Figures 1 and 4. Such shifting and release of the latch plate substantially aligns the inclined annular bore of the plate with the cross sectional area of the shank embraced whereby great freedom of slidability of the curved shank through the plate is assured. Such action and freedom with applicant's advantageous narrowing of the spaced relations of the gripping edges of the inclined latch plate bore is not possible with a latch plate where the shank embracing bore is formed on an axis extending perpendicular to the general plane of the plate. In such an instance, the bore, to properly grip, must be made to quite closely fit the shank which necessarily means that free sliding of the shank through release of the latch plate is substantially impeded.*

Minor variations from the disclosed embodiment may be made without departure from the spirit of the invention, the limits of which are defined in the appended claims.

What I claim is:

1. An actuating and locking mechanism for a pliers type tool having a pair of handles, comprising an end portion on one handle having an aperture, a curved shank on the end of the other handle extending through said aperture, a terminal member on said end portion, a latch plate having a bore receiving said shank and gripping said shank when the latch plate is tilted in one direction, said latch plate having an extension on the side of said terminal remote from said shank, a lever pivoted on said extension for movement in two directions, an intermediate portion of said lever engaging said terminal to move said terminal relative to the latch plate in a direction toward said other handle when the lever is moved toward said other handle, a spring to bias the latch plate to pivot toward said other handle to grip said shank, said flange engaging said latch plate when said lever is moved toward said other handle and then moved transversely of the shank.

2. An actuating and locking mechanism for the handles of a pliers type tool, comprising a terminal on one handle extending toward the other handle and having a slot therein a latch plate having an inclined bore with sharp terminal edges and an extension protruding through said slot, a lever having a flange and a portion extending through said slot, a curved shank on the end of the other handle extending toward and beyond said one handle, said shank extending through said bore in said latch plate, a spring compressed between said latch plate and said one handle to bias said latch plate into a position with said sharp edges gripping said shank, said lever when shifted in one direction engaging said terminal at the end of said slot therein to move said one handle toward the other handle, said flange on the lever when moved in a transverse direction locking said handles against reverse relative movement.

3. Actuating and locking mechanism for the handles of a pliers type tool, comprising a terminal on the end of one handle, said terminal having a slot, a curved shank on the end of the other handle extending toward and beyond said one handle, means operatively connected with said shank and comprised of a latch plate and a lever having one end of each extending through the slot in said terminal, said lever engaging the terminal at the end of said slot therein to move said one handle toward the other handle when the lever is pivoted into one position about a fulcrum on said one end of the latch plate, and a flange on said lever on the side thereof adjacent said latch plate whereby the lever can be locked in said position.

*4. Grip lock mechanism for a tool such as pliers which employs a pair of opposed pivoted gripping handles, said mechanism comprising a fulcrum element secured to the inner side of one of said handles, a curved shank of generally circular cross-section fixed to the other gripping handle and curved substantially concentrically with the pivot of said handle and extending toward and beyond said first handle, a latch plate swingably mounted in said fulcrum element and having a body normally disposed in spaced, close-to-parallel relation with said first handle, said latch plate having a single, uniform-diameter annular gripping bore accommodating and surrounding said shank, said gripping bore having its axis inclined from a line extending normal to the body of said latch plate to define sharp gripping edges on the top and bottom of said plate and on opposite sides of said bore, a coil spring surrounding said shank and interposed between said latch plate and said first mentioned handle for urging said plate to gripping position whereby, with said inclined bore, said sharp gripping edges simultaneously engage the front and rear side portions of said shank with the spacing thereof decreased in gripping while, when said latch plate is depressed against the spring, the bore is disposed substantially axially of the embraced portion of the shank in free clearance therefrom, the diameter of said bore being such as contrasted with that of said shank to provide substantial clearance about said shank when said latch plate is swingably released.*

*5. Grip lock mechanism for a tool such as pliers which employs a pair of opposed, pivoted gripping handles, said mechanism comprising an inturned terminal at the end of one of said handles having a fulcrum element thereon, a curved shank of generally circular cross section fixed to the corresponding end of the other handle and curved concentrically with the pivot of said last mentioned handle and extending toward and beyond said first mentioned handle, a latch plate having a rear extension swingably mounted in said inturned terminal adjacent said fulcrum element and having a body normally disposed in spaced, close-to-parallel relation with said first handle, said latch plate having a single, uniform-diameter annular gripping bore accommodating and surrounding said shank, said gripping bore having its axis inclined from a line extending normal to the body of said latch plate to define spaced, sharp gripping edges at the top and bottom of said plate and on opposite sides of said bore, spring means interposed between said latch plate and said first mentioned handle for urging said plate to gripping position whereby, with said inclined bore, said sharp gripping edges simultaneously engage the front and rear side portions of said shank with the spacing thereof decreased in gripping while, when said latch plate is depressed against the spring, the bore is disposed substantially axially of the embraced portion of the shank in free clearance therefrom.*

*6. The structure set forth in claim 5 wherein said fulcrum element is formed by a substantially rectangular slot in said terminal and wherein the rear extension of said latch plate engages said slot for limited longitudinal shifting position therein to facilitate working clearance of said shank from said gripping bore upon release of said latch plate.*

*7. Grip locking mechanism for a device having relatively movable, generally opposed members, said mechanism comprising a fulcrum element attached to one of said members, a shank of substantially circular cross section fixed to the opposite of said members and extending towards and beyond said first member, a latch plate swingably mounted in said fulcrum element and having a body normally disposed transversely of said shank, said latch plate having a single, uniform-diameter annular gripping bore accommodating and surrounding said shank, said gripping bore having its axis inclined from a line extending perpendicular to the body of said latch plate to define sharp or acute gripping edges on the top and bottom of said plate and on opposite sides of said bore and said shank, said sharp gripping edges precisely fitting said shank in gripping operation and intersecting said shank in planes perpendicular to the axis of said shank, resilient means interposed between said latch plate and said first mentioned member for urging said plate to gripping position whereby with said inclined bore, said sharp gripping edges simultaneously engage the front and rear side portions of said shank with the spacing thereof decreased in gripping while, when said latch plate is released against the action of said resilient means, the bore is disposed substantially axially of the embraced portion of the shank in free clearance therefrom.*

WALTER SARVIE.

References Cited in the file of this patent or the original patent

UNITED STATES PATENTS

| Number | Name | Date |
|---|---|---|
| 1,371,080 | Dupuy | Mar. 8, 1921 |
| 1,879,452 | Palotck | Sept. 27, 1932 |
| 1,944,116 | Stratman | Jan. 16, 1934 |
| 2,392,820 | Heinrich | Jan. 15, 1946 |
| 2,262,429 | Lucker | Nov. 11, 1949 |

FOREIGN PATENTS

| Number | Country | Date |
|---|---|---|
| 141,806 | Great Britain | Apr. 20, 1920 |